UNITED STATES PATENT OFFICE.

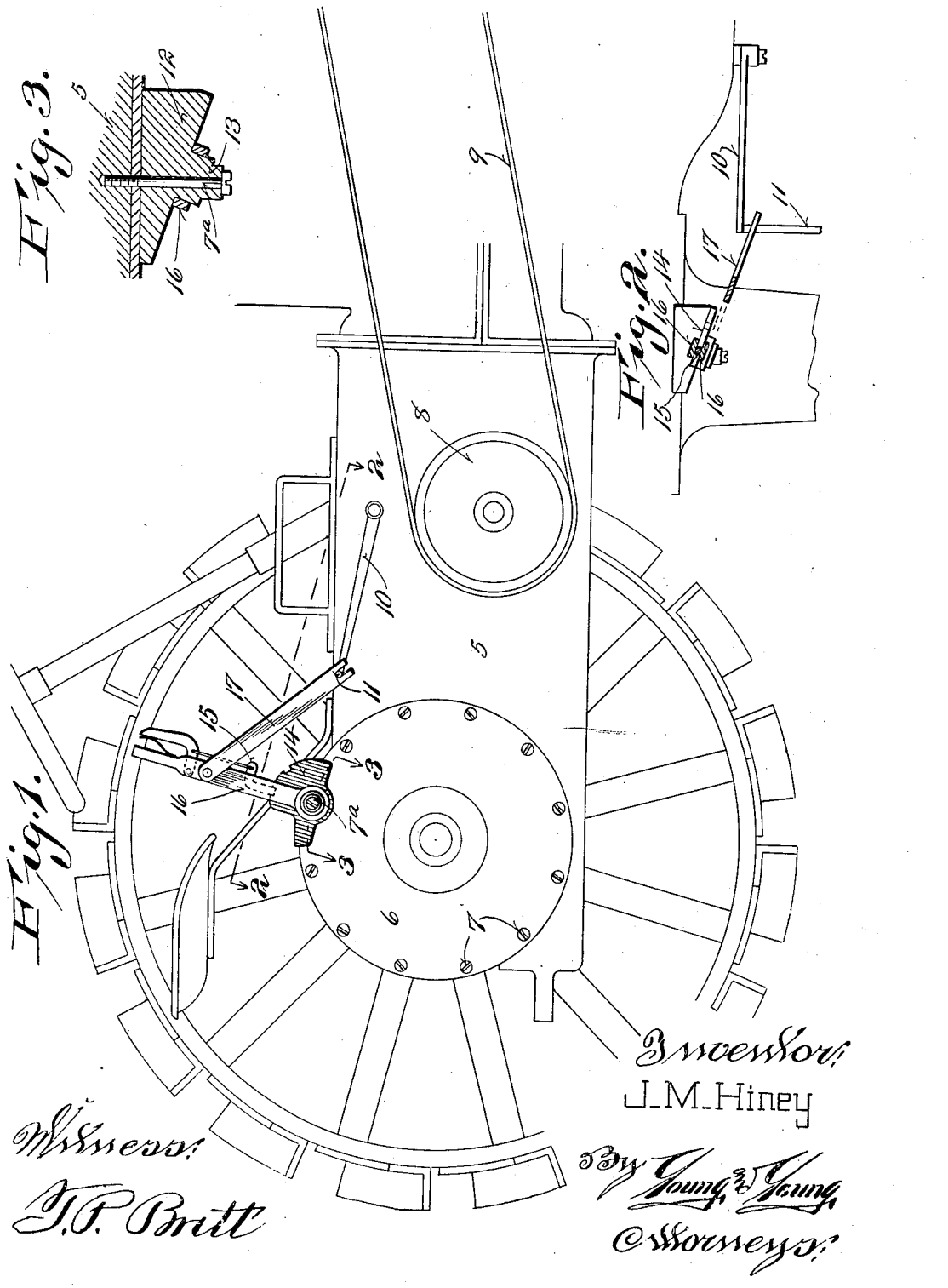

JOSEPH M. HINEY, OF MIDDLETON, WISCONSIN.

CLUTCH-CONTROL DEVICE.

1,359,248. Specification of Letters Patent. Patented Nov. 16, 1920.

Application filed October 13, 1919. Serial No. 330,246.

*To all whom it may concern:*

Be it known that I, JOSEPH M. HINEY, a citizen of the United States, and resident of Middleton, in the county of Dane and State of Wisconsin, have invented certain new and useful Improvements in Clutch-Control Devices; and I do hereby declare that the following is a full, clear, and exact description thereof.

My invention relates to new and useful improvements in means for controlling the position of the transmission clutch pedal of a tractor of the Fordson or similar type which is provided with a pulley driven from the engine transmission and adapted to be connected by a belt with the drive pulley of a grain separator or other mechanism.

When the belt is in place, it is practically impossible to crank the engine unless the clutch lever or pedal is moved to retracted position, and in view of the fact that the clutch lever is normally urged to operative position for the clutch, considerable inconvenience has heretofore been encountered by the necessity of temporarily tying the clutch down, or else requiring two persons to engage in cranking the engine, one holding the clutch down while the other operates the crank. It has also heretofore been exceedingly inconvenient to momentarily stop the drive action from the tractor pulley for the purpose of adjustment of the driven mechanism, without stopping operation of the engine.

It is therefore the object of my invention to provide a device for holding the drive pulley controlling clutch lever of a tractor mechanism in releasing position, and it is more particularly my object to provide such a device which is most readily operable and which may be applied as an attachment to tractors of the Fordson type in a most convenient manner.

With the above and other objects and advantages in view, which will be apparent as the description proceeds, my invention resides in the novel features of construction, combination and arrangement of the parts hereinafter described and defined by the appended claims.

In the accompanying drawings:

Figure 1 is an elevational view in conventional outline of a portion of the structure of a tractor of the Fordson type, and showing my clutch control device associated therewith.

Fig. 2 is a sectional view through the device on a plane indicated by the line 2—2 of Fig. 1.

Fig. 3 is a detail sectional view on a plane indicated by the line 3—3 of Fig. 1.

Referring now more particularly to the accompanying drawings, 5 designates in conventional outline the transmission casing of a tractor structure which terminates in an annular end wall structure having the flared attaching portions of the axle housings 6 secured to its side edges by the bolts 7. The usual belt pulley 8 is mounted at one side of the transmission casing and adapted to carry a belt 9 for driving any desired mechanism such as a grain separator, saw, or the like. The clutch lever 10 is pivoted to the casing above the pulley and extends rearwardly from its pivot connection, the free end of the lever carrying an outwardly projecting arm 11 and it is noted that the lever and arm 11 are disposed outwardly of the attaching portions of the axle housings 6.

I utilize one of the securing bolts 7 of an adjacent axle housing to mount my improved clutch controlling device, this bolt designated particularly at 7ª being relatively long. I provide an attachment block 12 adapted to fit against the upper portion of the flared end of the axle housing, and carrying an outstanding boss 13 receiving the bolt 7ª which is passed through said boss and through the block and axle housing into the annular wall portion of the transmission casing 5. In view of the fact that the clutch lever is disposed laterally of the plane of the axle housing end, the outer face of the attachment block is inclined to afford a substantially triangular shape to the block in plan, an outstanding rack segment 14 is provided at the outer portion of the block adapted to coöperate with a pawl 15 carried by a lever 16 pivoted on and upstanding from the inner portion of the boss 13, said inner portion of the boss having an annular bearing face whose axis is disposed at right angles to the outer inclined face of the attachment block whereby the lever 16 is held to swing in a plane intersecting the arm 11 of the clutch lever. A link 17 has one end pivoted to the upper portion of the lever 16 and the other end of the link is bifurcated to loosely straddle the arm 11 which is urged into engagement with the link by the upward resilient pressure of said arm.

To hold the clutch lever in downward position, it is merely necessary to swing the control lever 16 forwardly and engage its pawl 15 in the forward notch of the rack segment 14.

What is claimed is:

1. The combination with a tractor structure including a transmission mechanism and a clutch lever pivoted at the forward portion of the transmission casing and extending rearwardly from its pivot connection and provided with a lateral arm at its rear end, of an attaching block secured to the rear portion of the transmission casing, a control lever pivotally connected with said block, a rack segment carried by the block, a coöperating pawl carried by the lever and a link having one end pivoted to the control lever and having its other end bifurcated to straddle the arm of the clutch lever.

2. The combination with a tractor structure including a transmission mechanism and a clutch lever pivoted at the forward portion of the transmission casing and extending rearwardly from its pivot connection and provided with a lateral arm at its rear end, of an attaching block secured to the rear portion of the transmission casing, said attaching block being substantially triangular in shape whereby one of its side faces is inclined obliquely of the casing, a boss extending from said face having a bearing surface whose axis is disposed at right angles to said face, an upstanding control lever pivoted on said bearing surface, means for holding said lever in desired positions and a link having one end pivoted to the control lever and having its other end connected with the arm of the clutch lever.

In testimony that I claim the foregoing I have hereunto set my hand at Middleton, in the county of Dane and State of Wisconsin.

JOSEPH M. HINEY.